UNITED STATES PATENT OFFICE.

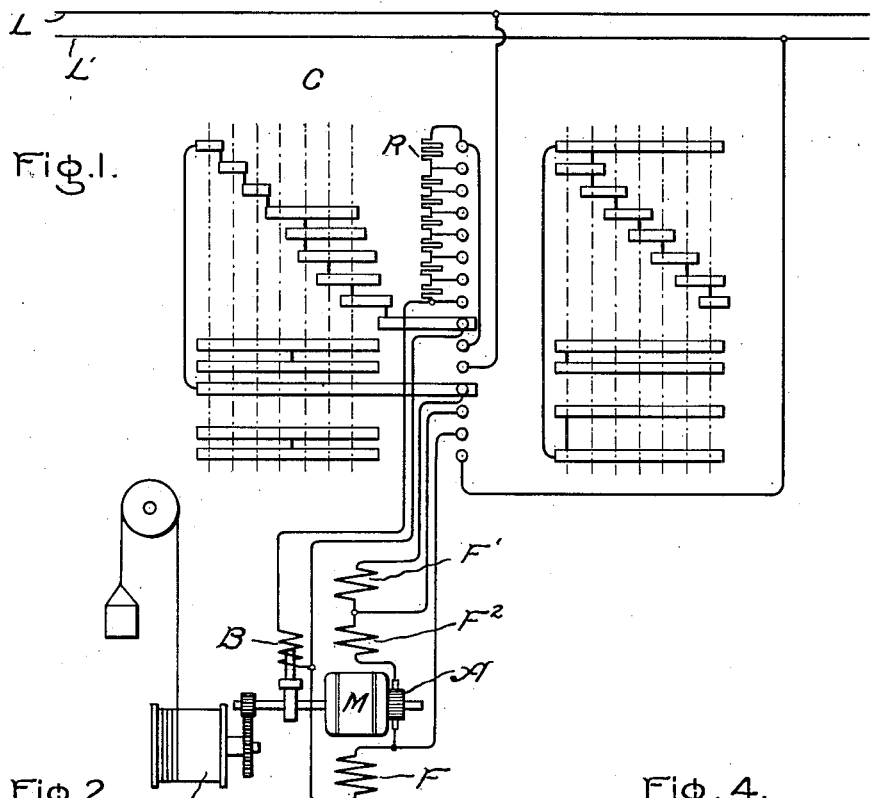
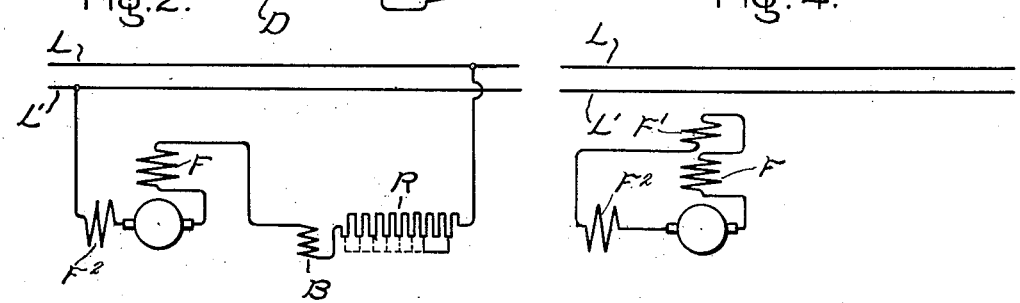
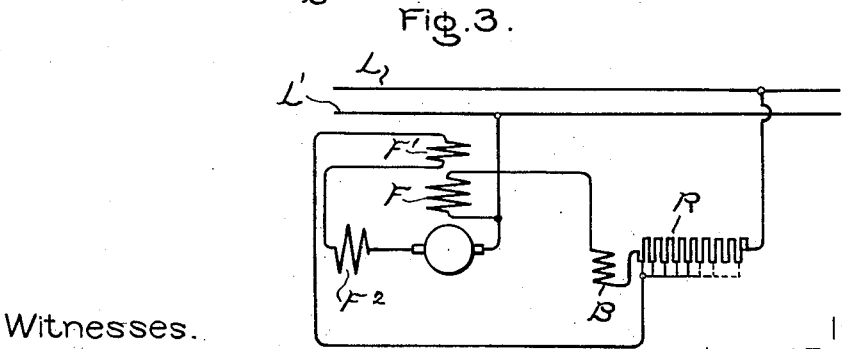

LIONEL FLEISCHMANN, OF BERLIN, GERMANY, ASSIGNOR TO GENERAL ELECTRIC COMPANY, A CORPORATION OF NEW YORK.

SYSTEM OF MOTOR CONTROL.

1,260,889.  Specification of Letters Patent.  Patented Mar. 26, 1918.

Application filed April 16, 1915. Serial No. 21,891.

*To all whom it may concern:*

Be it known that I, LIONEL FLEISCHMANN, a citizen of the United States, residing at Berlin, Germany, have invented certain new and useful Improvements in Systems of Motor Control, of which the following is a specification.

My invention has reference to the control of electric motors, and has for its object the provision of means whereby the motor may be operated and stopped, and in general be controlled in a reliable and efficient manner.

My invention is particularly applicable to motors intended for reversing, such as are used in hoisting, and it provides means for keeping the speed of the motor within safe limits, and for automatically retarding the motor by causing it to act as a dynamic braking generator. My invention further provides a brake which is automatically applied when the motor circuit is opened.

Hoisting motors provided with electrically actuated releasing brakes have been commonly connected as shunt motors for lowering the load, and during such operation the machine acts as a motor or as a generator, depending upon the load.

It is well known that commutating or interpole motors are, for certain positions of the brushes, unstable, so that when overloaded they have a tendency, when acting as generators, to raise their voltage or their current suddenly, and when acting as motors to race. For these reasons, the use of interpole motors with circuit connections for hoisting and for combined lowering and dynamic braking has hitherto been generally avoided.

In accordance with my invention, the field windings of the machine are divided into two groups, one of which, when the motor is operating for lowering and dynamic braking, is permanently connected in series with the armature, while the other group according as the machine is operating as a motor or as a generator in a local braking circuit, is connected in shunt to the armature or in series therewith.

More specifically, I provide a machine having two separate series field windings of different number of turns, the arrangement being such that when the machine is operating as a motor for hoisting, the greater separate field winding is connected in series with the armature, and when the machine is operating to lower a load this greater separate field winding is connected in shunt and the lesser separate field winding in series with the armature so that these separate field windings have an accumulative effect for lowering a load but have a differential effect in case the load in lowering overhauls the motor and becomes a generator.

In accordance with my invention, the operation of the common type of motor used for hoisting and lowering is, therefore, improved. My invention is particularly applicable, however, to an interpole motor, since the difficulties above referred to are avoided. In fact, my invention makes possible the use of this type of motor for this kind of operation.

For a fuller understanding of my invention, reference may be had to the accompanying drawings, in which Figure 1 shows diagrammatically an electric motor with its control system arranged in accordance with my invention, and Figs. 2, 3, and 4 are diagrams of the connections established by the control system.

Referring now to the drawings, M is a motor, having the usual armature A, and whose series field winding is divided into two separate groups F and F' of unequal number of turns, the winding F preferably having a greater number of turns than the winding F'. I have here illustrated my invention in connection with an interpole motor provided with commutating or interpole windings $F^2$. The motor is connected by suitable gearing to a hoist drum D, the movement of which is prevented by the release of an electro-magnetic brake B in the usual manner. The connections from the line L, L' are made to the motor through the controller C. The usual resistance R is also provided.

For hoisting the load, the controller is moved to bring the control contacts at the right in Fig. 1 into engagement with the brushes, and the circuit is closed through the greater separate field winding in series with the armature and with the interpole windings, thereby giving the desired series characteristic to the motor. The brake coil B is also included in the series circuit, and the resistance is gradually short-circuited as the controller is moved to its extreme position in the usual manner. I have here shown the separate field winding F' open circulated in the hoisting position of the controller, and have, therefore, omitted this winding in Fig. 2 of the drawing. It will, however, be understood that for the hoisting position of the controller, this winding could, if desired, be included in series with the armature, but with its system of connections reversed with respect thereto, so that the motor will have a series characteristic.

For lowering the load, the controller is moved to bring the contacts shown at the left in Fig. 1 into engagement with the brushes, and the system of connections shown in Fig. 3 is established, the greater separate field winding F being in shunt to the armature, and the lesser separate field winding F' being in series therewith and in series with the interpole windings of the motor. The resistance R is also included in series with the field F, and is gradually cut out of the armature circuit until, in the extreme position, the armature of the motor is connected directly across the line. The windings F and F' are arranged for an accumulative effect when the machine is operating as a motor.

It is obvious that when the machine is lowering a load, in case the load over-runs the motor the machine will act as a generator, and the fields will act differentially rather than accumulatively.

When the controller is moved to the off position, the system of connections shown in Fig. 4 is established, in which both of the separate field windings and the interpole windings are included in a local dynamic braking circuit which retards the motor when it is operating either in the hoisting or lowering direction.

It will be apparent that the lesser separate field winding, connected in series with the armature when the motor is connected for lowering the load, will prevent any tendency of the motor to race or otherwise become unstable and thereby cause damage, because an increase of speed will cause the motor to run as a generator, raising the armature voltage and causing a greater current to flow through the winding F' which acts to reduce the effective excitation of the winding F because of the differential action of these windings and thus the armature voltage is automatically reduced bringing the motor back to a state of equilibrium. The accumulative compounding effect of the fields F and F' during motoring and the differential action of these windings during generator operation tend to maintain stable conditions for the machine and neutralize the unbalancing effect which the interpoles would otherwise cause.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In combination, an electric motor comprising two separate series field windings of different number of turns, means for connecting the greater field winding in series with the armature for operation in one direction and for connecting this winding in shunt to and the lesser field winding in series with the armature for operation in the other direction.

2. In combination, a source of current, a motor provided with two series field windings of different number of turns and with interpole windings, and means for connecting the greater series field winding and the interpole windings in series with the armature for operation in one direction, and for connecting this greater field winding in shunt to said armature and the lesser field winding and the interpole winding in series with the armature for operation in the other direction.

3. In combination, an electric motor provided with two separate series field windings of different number of turns, of means for connecting only the greater series field winding in series with the armature for operation in one direction, and for connecting this winding in shunt, and the lesser field winding in series with the armature for operation in the other direction.

4. The combination with a series wound dynamo electric machine having two separate series field windings of different number of turns, of means for connecting the machine to a source of supply so that the machine will have a series characteristic for operation as a motor in one direction, and for connecting the machine to the source of supply with the greater series field winding in shunt, and the lesser series field winding in series with the armature for operation in the other direction so that the said windings have an accumulative effect for motor operation and a differential effect when the machine operating in this other direction becomes a generator.

5. The combination with an electric motor having only two separate series field windings and an interpole winding, of a controller therefor having means for connecting the interpole winding in series with the armature in all operative positions of the controller, and for arranging the said series field windings to give the motor a series characteristic for operation in one direction, and an accumulative compound characteristic for operation in the other direction, the said series windings having a differential effect when the motor operating in this other direction becomes a generator, and a tendency to neutralize the unbalancing effect of the interpole winding during both motor and generator operation in this other direction.

6. In combination, a motor provided with two series field windings of different number of turns and with interpole windings, and means for connecting only the greater series field winding and the interpole windings in series with the armature for operation in one direction, and for connecting this greater series field winding in shunt and the lesser series field winding and the interpole windings in series with the armature for operation in the other direction.

7. In combination, a source of current, a motor provided with two field windings and a controller for connecting one winding in series with and the other in shunt to the armature in one position of the controller and for connecting both windings in a local dynamic braking circuit with the armature in another position of the controller.

8. In combination, a sourse of current, a motor provided with two separate field windings and with interpole windings, and a controller for connecting one of the separate field windings and the interpole windings in series with the armature and the other separate field winding in shunt thereto in one position of the controller, and for connecting both separate field windings and the interpole windings in a local dynamic braking circuit in another position of the controller.

9. In combination, a motor provided with two field windings, means for connecting one field winding in series with the armature for one direction of movement, for connecting one field winding in series with and the other in shunt to the armature for the other direction of movement, and for connecting both field windings in a local dynamic braking circuit with the armature.

10. In combination, a source of current, a motor provided with two separate field windings and with interpole windings, and a controller for connecting one of the separate field windings and the interpole windings in series with the armature in one position of the controller, and for connecting the other separate field winding and the interpole windings in series with the armature and the first separate field winding in shunt thereto in another position of the controller, and for connecting both of the separate field windings and the interpole windings in a local dynamic braking circuit with the armature.

11. In combination, a source of current, a resistance, a motor provided with two field windings, and means for connecting one winding in series with said armature and the other winding in shunt thereto and in series with more or less of said resistance, and for connecting the two windings in a local dynamic braking circuit with the armature.

12. In combination, a source of current, a resistance, a motor provided with two separate field windings and with interpole windings, and means for connecting one of the separate field windings and the interpole windings in series with the armature and the other separate field winding in shunt thereto and in series with more or less of said resistance, and for connecting both of said separate field windings and said interpole windings in a local dynamic braking circuit.

13. The method of controlling an electric motor having two separate series field windings of different number of turns which consists in connecting one of the field windings in series with the armature for operation in one direction, and connecting the greater winding in shunt and the lesser winding in series with the armature for operation in the other direction.

14. The method of controlling an electric motor having two separate field windings of different number of turns, which consists in connecting the field winding having the greater number of turns in series with the armature for operation in one direction and connecting this winding in shunt and the other winding in series with the armature for operation in the other direction.

15. The method of controlling an electric motor having two separate series field windings of different number of turns which consists in connecting one of the field windings in series with the armature for operation in one direction and connecting the field windings to the armature so that they will have an accumulative effect for moving a load by the motor in the opposite direction but will have a differential effect in case the load moving in this direction causes the motor to run as a generator.

16. The method of controlling an electric motor having an interpole winding and two separate series field windings of different number of turns which consists in connecting the greater separate field winding in series with the armature and the interpole winding for operation in one direction, and connecting the greater separate field winding in shunt to the armature and the lesser separate field winding in series with the armature and the interpole winding for operation in the other direction.

17. The method of controlling an electric motor having an interpole winding and two separate series field windings of different number of turns which consists in connecting the greater separate field winding in series with the armature and the interpole winding for operation in one direction, and connecting the separate field windings and the interpole winding to the armature so that the separate field windings have an accumulative effect for moving a load by the motor in the opposite direction but have a differential effect in case the load moving in this direction causes the motor to run as a generator.

18. The method of controlling an electric motor having two separate series field windings of different number of turns, which consists in connecting one of the field windings in series with the armature and a resistance for operation in one direction, and connecting the greater winding with more or less of the resistance in shunt to the armature and the lesser winding in series with the armature for operation in the other direction.

19. The method of controlling an electric motor having an interpole winding and two separate series field windings of different number of turns which consists in connecting one of the separate field windings in series with the armature and a resistance for operation in one direction, and connecting the greater separate field winding with more or less of the resistance in shunt to the armature and the lesser separate field winding in series with the armature and the interpole winding so that the separate field windings will have an accumulative effect for moving a load by the motor in the opposite direction but will have a differential effect in case the load moving in this direction causes the motor to run as a generator.

In witness whereof, I have hereunto set my hand this twentieth day of March, 1915.

LIONEL FLEISCHMANN.

Witnesses:
RICHARD NEUMANN,
CRISTIANINO SARLI.